United States Patent
Tian et al.

(10) Patent No.: US 9,523,903 B2
(45) Date of Patent: Dec. 20, 2016

(54) ELECTROPHORETIC INK, ELECTRONIC PAPER AND DISPLAY METHOD FOR ELECTRONIC PAPER

(75) Inventors: Xiaoxiong Tian, Beijing (CN); Shi Shu, Beijing (CN); Jianshe Xue, Beijing (CN); Jisheng Zhao, Beijing (CN); Lin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 221 days.

(21) Appl. No.: 13/805,046

(22) PCT Filed: Aug. 15, 2012

(86) PCT No.: PCT/CN2012/080178
§ 371 (c)(1),
(2), (4) Date: Dec. 18, 2012

(87) PCT Pub. No.: WO2013/023598
PCT Pub. Date: Feb. 21, 2013

(65) Prior Publication Data
US 2013/0141779 A1    Jun. 6, 2013

(30) Foreign Application Priority Data
Aug. 15, 2011 (CN) .......................... 2011 1 0233954

(51) Int. Cl.
*G02B 26/00* (2006.01)
*G02F 1/167* (2006.01)
(Continued)

(52) U.S. Cl.
CPC ....... *G02F 1/167* (2013.01); *G02F 2001/1672* (2013.01); *G02F 2001/1676* (2013.01)

(58) Field of Classification Search
USPC 252/582, 501.1, 583; 204/606, 450; 345/48, 345/84, 85, 107, 173, 211; 347/112; 359/296, 290; 427/58; 428/1.25, 1.26, 428/473.5, 474.4
See application file for complete search history.

(56) References Cited

U.S. PATENT DOCUMENTS 4,776,675 A * 10/1988 Takaochi .......... G02F 1/133516
                                                        349/106
6,693,620 B1    2/2004 Herb et al.
(Continued)

FOREIGN PATENT DOCUMENTS

CA    2340672    *  6/1999   ............ G02F 111/67
CN    1320227 A    10/2001
(Continued)

OTHER PUBLICATIONS

Runying Dai, Gang Wu, Peipei Yin, Hongzheng Chen, Microcapsule-based materials for electrophoretic displaysMater. Res. Soc. Symp. Proc. vol. 1359 © 2011 Materials Research Society.*
(Continued)

*Primary Examiner* — Bijan Ahvazi
(74) *Attorney, Agent, or Firm* — Ladas & Parry LLP

(57) ABSTRACT

An embodiment of the invention discloses a kind of electrophoretic ink comprising an electrophoretic display solution which is an electrorheological fluid comprising a base solution, solid particles and an additive, wherein the solid particles account for 5%-50% of the electrorheological fluid by mass-volume percentage. The electrophoretic display solution is preferably a negative electrorheological fluid. The invention also discloses an electronic paper comprising the electrophoretic ink and a display method for the electronic paper.

8 Claims, 2 Drawing Sheets

(51) Int. Cl.
  *C09K 9/00* (2006.01)
  *G02F 1/00* (2006.01)
  *G06F 3/038* (2013.01)
  *G09G 5/00* (2006.01)
  *C09K 19/00* (2006.01)

(56) References Cited

U.S. PATENT DOCUMENTS

| | | | |
|---|---|---|---|
| 6,991,834 B1 * | 1/2006 | Gibbons | C08G 73/10 349/123 |
| 2006/0209058 A1 * | 9/2006 | Nakamura | G09G 3/3291 345/211 |

FOREIGN PATENT DOCUMENTS

| | | |
|---|---|---|
| CN | 1979319 A | 6/2007 |
| CN | 2008-096524 A | 4/2008 |
| KR | 2010005882 A | 6/2010 |
| WO | 02/01288 A1 | 1/2002 |

OTHER PUBLICATIONS

Tian Hao, electrorheological Fluids, Adv.Mater.,13, No. 24 1847-1857, 2001.*

Hideyuki Uejima; "Dielectric Mechanism and Rheological Properties of Electr-Fluids", Japanese Journal of Applies Physics, vol. 11, No. 3, Mar. 1972, pp. 319-326.

Jiang Ying; "Preparation and Application of Electrorheological Fluids", Shanghai Jiaotong University Master's Degree Thesis, Jan. 1, 2006; 74 pages English Abstract-p. 4.

Tian Fang; Studies on Synthesis of Poly)p-phenylene vinylene) and its Electrorheological Performance; Xiangtan University Journal; May 25, 2008; 60 pages, English Abstract begins on p. 3.

Zhao Xiaopeng, et al; "Properties of titania Electrorheological Fluids Modified by Rare Earth", Chinese Journal of Materials Research, vol. 14, No. 6, Dec. 2000, 7 pages.

Yasufumi Otsubo, et al; "Effect of Surface Modification of Colloidal Silica on the Electrorheology of Suspensions", Journal of Colloid and Interface Science, vol. 146, No. 2, Oct. 15, 1991; pp. 395-404.

Y. Komoda, et al; "Photoelectrorheology of $TiO_2$ Nanoparticle Suspensions", Langmuir, vol. 13, pp. 1371-1373; Publication date (Web): Mar. 19, 1997.

Yu. F. Deinega, et al; "Electric fields in the rheology of disperse systems", Rheologica Acta; vol. 23, Issue 6, pp. 636-651; Nov./Dec. 1984.

V.I. Kordonsky, et al; "Electrorheological polymer-based suspensions", Journal of Rheology, vol. 35, Issue 7, Oct. 1991, pp. 1427-1439.

International Search Report; dated Nov. 29, 2012; PCT/CN2012/080178.

International Preliminary Report on Patentability dated Feb. 18, 2014; PCT/CN2012/080178.

Second Chinese Office Action dated Mar. 18, 2014; Appln. No. 201110233954.3.

First Chinese Office Action dated Aug. 15, 2013.

Yan-Jun Zheng, et al; "Electroheological Mechanism and Electrorheological Materials", Journal of Baoding Teachers College, vol. 18, No. 2. Apr. 2005, 6 pages (English Abstract p. 6).

Third Chinese Office Action dated Sep. 2, 2014: Appln. No. 201110233954.3.

Fourth Chinese Office Action Appln. No. 201110233954.3; Dated Jan. 19, 2015.

Chinese Rejection Decision Appln. No. 201110233954.3; Dated Apr. 20, 2015.

* cited by examiner

ELECTROPHORETIC INK, ELECTRONIC PAPER AND DISPLAY METHOD FOR ELECTRONIC PAPER

TECHNICAL FIELD

Embodiments of the invention relate to electrophoretic ink, an electronic paper containing the electrophoretic ink, and a display method for the electronic paper.

BACKGROUND

Electronic paper is a new display technique. One outstanding advantage of the electronic paper lies in the maintenance of the image. The electronic paper can maintain the image that it displays for a long period of time without power supply. Only when change in the image that it displays is needed is change implemented by applying electric field through electrodes. This saves plenty of energy.

Electrophoretic ink is crucial to the performance of the electronic paper. Electrophoretic ink comprises electrophoretic ink microcapsules, microcups and Gyricons. Here, electrophoretic ink microcapsules are taken as an example. Many small-volume "microcapsules" adhere to the surface of an electrophoretic ink screen, in which negatively charged black particles and positively charged white particles are encapsulated. By changing the charges to allow particles of different colors to arrange orderly, a visual effect of starkly contrasted black and white can be exhibited, as shown in FIG. 1. FIG. 1 is a schematic diagram of an electronic paper. The left panel is the magnified view of the electrophoretic ink microcapsules. This electronic paper comprises a top display electrode 1, a bottom electrode 2 and an electrophoretic ink microcapsule layer disposed therebetween.

However, many aspects of the current electrophoretic ink needs to be improved, for example, dynamic state images are displayed slowly, static state images are poorly maintained, and so on.

In the prior art, an electrophoretic ink display is implemented by utilizing the "bistable state" of an electrophoretic solution, that is, the density of the small display particles (spheres) is equivalent to the density of the electrophoretic solution, and thus after a power supply is switched off, the image remains unchanged.

However, there still exist the following issues in the current electrophoretic solution.

1. The electrophoretic solution, due to its equivalent density to the small display particles (spheres), can only ensure that the small display particles (spheres) do not go up and down, but cannot ensure that the image is "locked" from the external influences, for example, shaking of the display screen under external forces, external strong fields, etc.

2. The resistance of the electrophoretic solution to the small display particles (spheres) is constant no matter whether an image is to be changed by applying an electric field to the electrodes or an image is to be maintained in the static state. However, when the image is to be changed, the resistance of the electrophoretic solution to the small display particles (spheres) is unnecessary, whereas in image maintenance in the static state, such resistance is necessary.

SUMMARY

In order to overcome the defects in the prior art, an aspect of the invention provides electrophoretic ink comprising an electrophoretic display solution which is an electrorheological fluid comprising a base solution, solid particles and an additive.

Another aspect of the invention provides an electronic paper comprising the electrophoretic ink of the invention.

Still another aspect of the invention provides a display method for the electronic paper of the invention, wherein the viscosity of the electrophoretic display solution is changed by changing the electric field strength applied to the electrophoretic display solution so that the viscosity of the electrophoretic display solution becomes lower in dynamic image switching and higher during static image maintenance.

BRIEF DESCRIPTION OF THE DRAWINGS

In order to more clearly illustrate the technical solutions of the embodiments of the invention, the drawings of the embodiments are briefly introduced below. Apparently, the drawings described below merely involve some embodiments of the invention, rather than limiting the invention.

DETAILED DESCRIPTION

Figure 1:
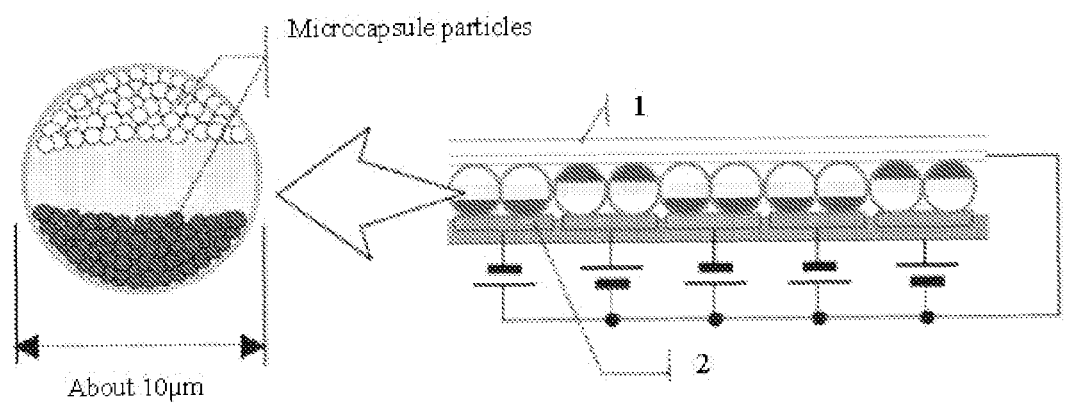
FIG. 1 is a schematic diagram of electronic paper.

In order to make the object, technical solutions and advantages of the embodiments of the invention more clear, the technical solutions of the embodiments of the invention are clearly and completely described below in light of the drawings of the embodiments of the invention. Apparently, the embodiments described are a subset of the embodiments, rather than all embodiments of the invention. Any other embodiments obtained by a person of ordinary skill in the art based on the embodiments of the invention described, without resorting to creative labor, fall into the scope of protection of the present invention.

The prior art has ever not disclosed the application of electrorheological fluid in electrophoretic ink. In embodiments of the invention, the property of the electrorheological fluid is utilized to improve the performance of electrophoretic ink. The embodiments of the invention are illustrated in more details below.

Embodiment 1: Electrophoretic Ink

The electrophoretic ink of the embodiment of the invention is made from multiple electrophoretic ink microcapsules, multiple electronic microcups or multiple Gyricons. Moreover, the electrophoretic ink of the embodiment of the invention allows display by mechanism of electrophoresis. The electrophoretic ink comprises an electrophoretic display solution, which is an electrorheological fluid comprising a base solution, solid particles and an additive. The electrophoretic ink microcapsules or microcups contain the electrophoretic display solution, or the Gyricons are surrounded by the electrophoretic display solution.

<Electrorheological Fluid>

The electrorheological fluid (ER fluid or ERF) mentioned in the present application is a suspension system foamed by dispersing microparticles with high dielectric constant in an insulating liquid with low dielectric constant. Under the action of external electric field, the apparent viscosity and shear strength of this suspension system transiently changes by several orders of magnitude, and exhibits solid-like properties when the electric field strength reaches a certain critical value. Moreover, this solid-liquid transition is characterized as being rapid, reversible and adjustable. An electrorheological fluid viscosity or rheologic property of which increase with the increase of the external electric field is termed a positive electrorheological fluid; and one whose viscosity or rheologic properties decrease with the increase of the external electric field is termed a negative electrorheological fluid.

The electrophoretic display solution described in the embodiment of the invention is a negative electrorheological fluid. Under the electric field of the electronic paper device itself, the dynamic switching and static maintenance of the electrophoretically displayed image are manipulated by using the negative electrorheological fluid, which overcomes the defects of the prior art electrophoretic solution which exhibits low resistance against shaking during static image maintenance and unaltered resistance to the small display particles (spheres) in dynamic image switching.

Among the components of the electrorheological fluid of the embodiment of the invention, the base solution is an insulating oil, preferably silicone oil such as methyl siloxane oil; the solid particles are one or more of silica gel, aluminosilicates, complex metal oxides, complex metal hydroxides and high molecular semiconductor particles; and the additive is selected from one or more of water, acids, alkalis, salts and surfactants. The solid particles account for 5%-50% of the electrorheological fluid by mass-volume percentage.

Preferably, the negative electrorheological fluid of the embodiment of the invention can be selected from poly (methyl methacrylate)/silicone oil system, polytetrafluoroethylene/silicone oil system, magnesium hydroxide/silicone oil system, $TiO_2$/silicone oil system ($TiO_2$ particle suspension containing more than 10% water), poly(p-phenylene vinylene)/silicone oil system and polyamic acid salt/silicone oil system. More preferably, the negative electrorheological fluid is a polyamic acid salt/silicone oil system. The polyamic acid salt/silicone oil system is taken as an example. In this system, the solid particles are polyamic acid salt particles, and the base solution is methyl siloxane oil. In addition to the solid particles and the basic solution as the major components, the additive may be added according to different needs. Moreover, the additive may contain a remnant from the preparation of the raw materials (mainly some solid particles/a base solution). Furthermore, it is similar for other negative electrorheological fluid system.

The positive electrorheological fluid described in another embodiment of the invention can be a titanium dioxide micropowder/silicone oil system modified by rare earth. For its preparation, please refer to the method of preparation in literature, for example, Zhao et al. (Properties of Titania Electrorheological Fluids Modified by Rare Earth, Chinese Journal of Materials Research, 2000, 14(6): 604-608).

<Method for Preparing Negative Electrorheological Fluid>

The aforementioned various negative eletrorheological fluid systems can also be prepared according to methods in literature. For example, Boissy et al., 1995 disclosed a method for preparing a poly(methyl methacrylate) (PMMA)/silicone oil system of electrorheological fluid. Jiang et al. (Synthesis and Application of Electrorheological Fluids, Shanghai Jiaotong University, 2006) disclosed a method for preparing a magnesium hydroxide/silicone oil system. Komoda (Y. Komoda, T. N. Rao, A. Fujishima, Langmuir 13 1997 1371) studied a $TiO_2$ particle suspension having high water content. Tian Fang (Synthesis of poly(p-phenylene vinylene) and Studies on its Electrorheological Performance, Xiangtan University, 2008) disclosed a method for preparing a poly(p-phenylene vinylene)/silicone oil system. etc.

Among the aforementioned negative eletrorheological fluid systems of the embodiment of the invention, as for the $TiO_2$/silicone oil system, the water content of the $TiO_2$ particle suspension is higher than 10%. This is because that water has high dielectric constant and contains mobile ions, thus even small amount of water contained in the particles will still significantly improve the ability of electric polarization, which generates stronger interacting forces between particles, resulting a higher viscosity. However, if excessive water is added, the interaction between the two poles will be screened by the electric double layer of ions, thereby reducing the viscosity; therefore, when the water content is very high, properties of negative electrorheological fluid are exhibited. Moreover, water forms a water bridge within the phase contact region of two particles, and links the particles through surface tension. Ions in the water can migrate to any end of the particles, dragging water molecules with them. The increase of the water content at the end of the particles will improve the formation of the water bridge. When the water content of the $TiO_2$ particle suspension is higher than 10%, the desired technical effect of the invention can be advantageously achieved. Therefore, in embodiments, the water content of the $TiO_2$ particle suspension is required to be higher than 10%, and can be as high as possible to the extent of not affecting the stability and performance of the system. (See (1) Y. Komoda, T. N. Rao, A. Fujishima, Langmuir 13 1997 1371. (2) Deinega Y F, Vinogradov G V. Rheol. Acta, 1984, 23: 636-651. (3) Kordonsky V I, Korobko E V, Lazareva T G. J. Rheol., 1991, 35: 1427-1439. (4) Uejima H. Japan J. Appl. Phys., 1972, 11: 319-326. (5) Ostubo Y, Sekine M, Katayama S. J. Colloid Interface Sci., 1991, 146: 395-404).

The method for preparing is exemplified below by using the polyamic acid salt/silicone oil system as an example. The method for preparing it comprises the steps of synthesis of the polyamic acid and mixing with methyl siloxane oil.

<Negative Electrorheological Fluid—Method for Preparing Polyamic Acid Salt/Silicone Oil System>

1. Synthesis of Polyamic Acid

Pyromellitic dianhydride and diaminodiphenyl ether are reacted in a solvent, N,N-dimethylformamide to prepare polyamic acid. The reaction formula is as follows:

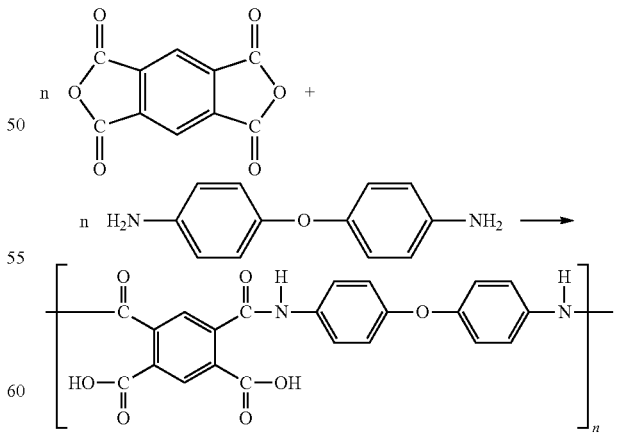

The backbones of pyromellitic dianhydride and diaminodiphenyl ether both contain aromatic rings which impart some thermostability to the products. Moreover, the ether linkage structures in the backbone also increase the flexibility of the material.

Alternatively, polyamic acid is prepared by condensation co-polymerization of 4,4'-diaminodiphenylmethane monomers in the solvent, dimethylformamide (DMF), with 3,3', 4,4'-benzophenonetetracarboxylic dianhydride (BTDA) and pyromellitic dianhydride in DMF solution. The scheme for the synthesis of polyamic acid by condensation co-polymerization is as follows:

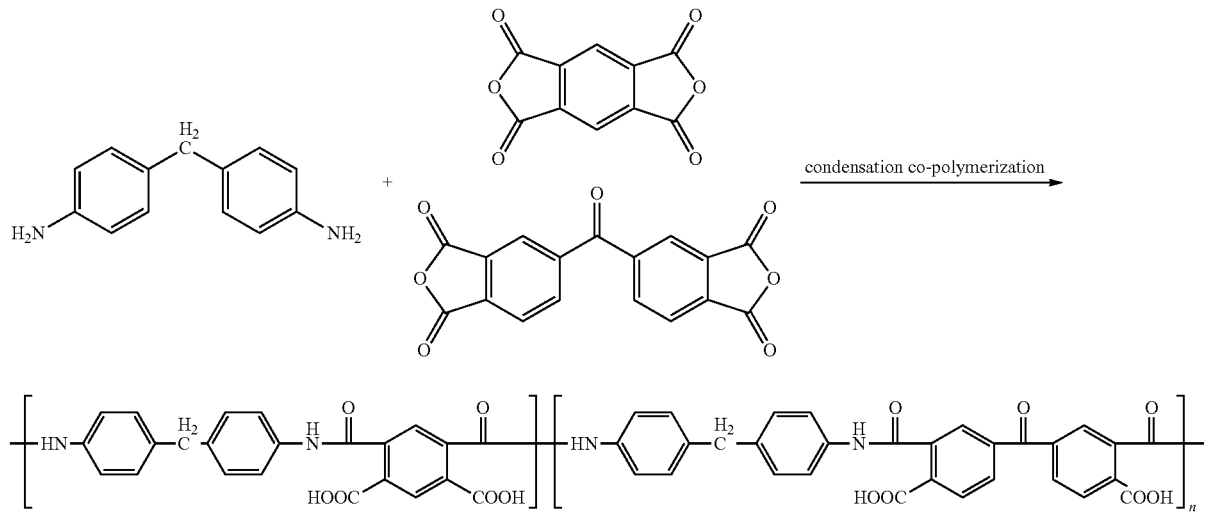

The polyamic acid obtained by the aforementioned polymerization is treated with an alkali solution to precipitate it from the solution, resulting in a polyamic acid salt.

The alkali solution may include $Ca(OH)_2$ solution, $Fe(OH)_2$ solution, $Fe(OH)_3$ solution, $Cu(OH)_2$ solution, $Zn(OH)_2$ solution, $Cr(OH)_3$ solution, or the like.

A specific example of the steps of the preparation is as follows.

For example, pyromellitic dianhydride and diaminodiphenyl ether, 0.01 mol each, are added into a three necked flask. N,N-dimethylformamide is added to make a solution in which the mass concentration of the reactant is 15%. After agitation for about 10 hours in an ice-water bath followed by agitation under room temperature for about 12 hours, a bright yellow transparent polyamic acid is obtained.

The polyamic acid obtained by polymerization is treated with 1 L 0.02 mol/L $Ca(OH)_2$ solution to precipitate it from the solution, thereby obtaining the calcium salt of polyamic acid.

With photoelectron spectroscopy analysis, the mass fractions of the major elements in the polyamic acid particles are as follows: ω (C) is 66%; w (O) ω 25.7%; and ω (N) is 8.3%. The mean diameter of the particles is 6.71 μm.

Figure 2:
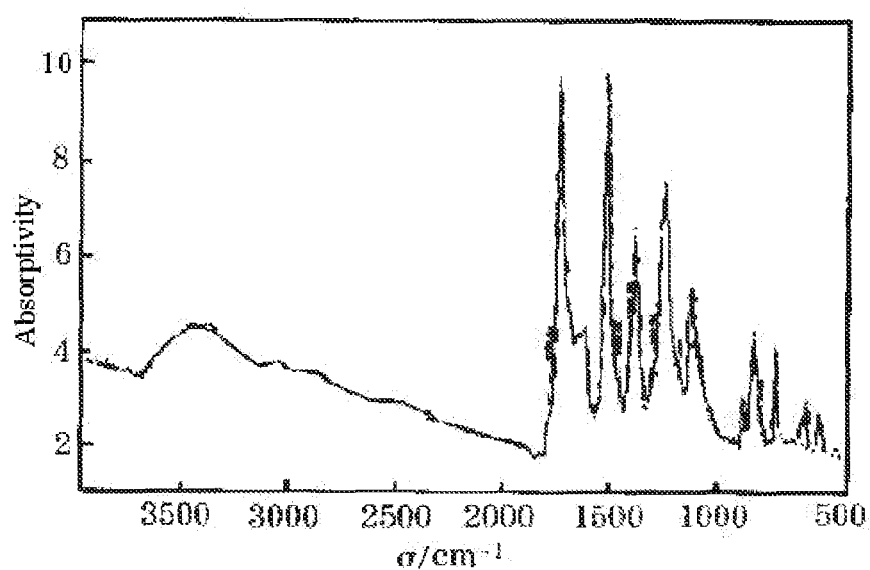
FIG. 2 is an infrared spectrum of the calcium salt of polyamic acid in Example 1.

FIG. 2 is the infrared spectrum of the calcium salt of polyamic acid. From FIG. 2, the stretching vibration peak of the C=O bond in the amide linkage at 1775.75 $cm^{-1}$ and 1723.73 $cm^{-1}$, as well as the stretching vibration peak of the C—N bond at 1378.51 $cm^{-1}$ can be found. Based on the position where the inferred characteristic absorption peak of the polymer appears, it can be confirmed that the product is a calcium salt of polyamic acid.

2. Mixing with Methyl Siloxane Oil

The polyamic acid salt particle thus obtained is thoroughly mixed with methyl siloxane oil by conventional methods, for example, agitation, etc., to make the solid particles, that is, the polyamic acid salt particles, have essentially the same density as the surrounding continuous phase to form a suspension system, resulting in the polyamic acid salt/silicone system of negative electrorheological fluid.

Figure 3:
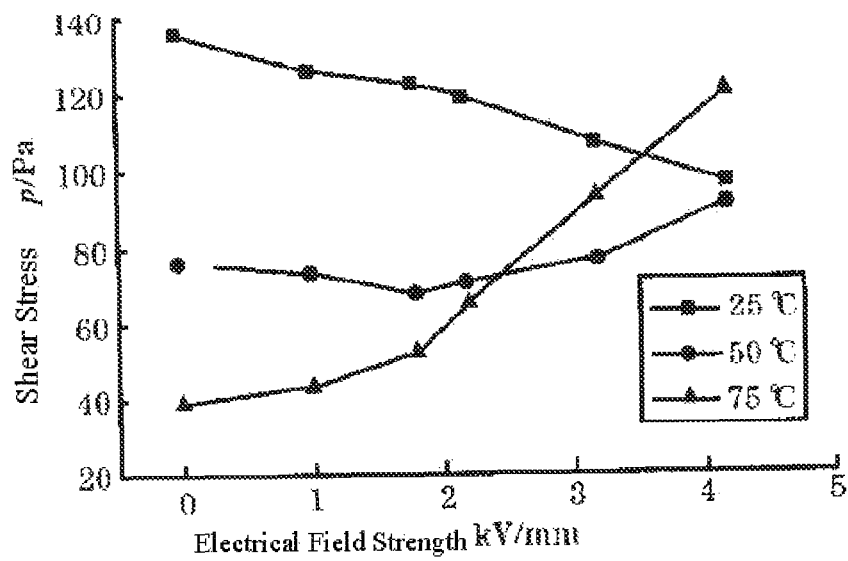
FIG. 3 shows the electrorheological performance of a negative electrorheological fluid polyamic salt/silicone oil system.

The electrorheological properties of the negative electrorheological fluid thus obtained are tested. The results are shown in FIG. 3. From FIG. 3, the relationship between the shear stress and the voltage reflects the relationship between the voltage and the image maintenance capacity. Higher shear stress indicates better static image maintenance capacity. On the contrary, the lower shear stress, the more beneficial to the change in the dynamic image switching. Under the actual voltage specifically used for electrophoretic ink, good negative eletrorheological performance is exhibited at both 50☐ and 25☐. Experiments using the same methods are conducted every between 50☐-70☐. Results indicate that good negative electrorheological performance is exhibited under 70☐.

<Negative Electrorheological Fluid—Method for Preparing Polyamic Acid Salt/Silicone Oil System>

1. Synthesis of Polyamic Acid 0.003 mol 4,4'-diaminodiphenylmethane (MDA) monomer is added into a dry four necked flask equipped with a magnetic stirrer, a thermometer and a nitrogen ingress pipe followed by the addition of a solvent, dimethylformamide (DMF). After thoroughly dissolving of the solute, a DMF solution containing 0.001 mol 3,3',4,4'-benzophenonetetracarboxylic dianhydride (BTDA) and 0.002 mol pyromellitic dianhydride (PMDA) is slowly added dropwise with an injector within 1 hour. The reaction is conducted with continuous $N_2$ aeration and maintained at a temperature of 30 degree Celsius (° C.). After reacting for 24 hours, the mixed solution is decanted into deionized water to allow the polymer to precipitate. After suck filtration, the polymer is first washed with deionized water and then several times with methanol. The resulting solid is placed in a vacuum drier for baking under normal temperature until constant weight to give polyamic acid (PAA) powder. The yield is calculated to be 91.52%.

The polyamic acid obtained by polymerization is treated with 100 ml 0.06 mol/L $Ca(OH)_2$ to allow it to precipitate from the solution, thereby obtaining the calcium salt of polyamic acid.

Figure 4:
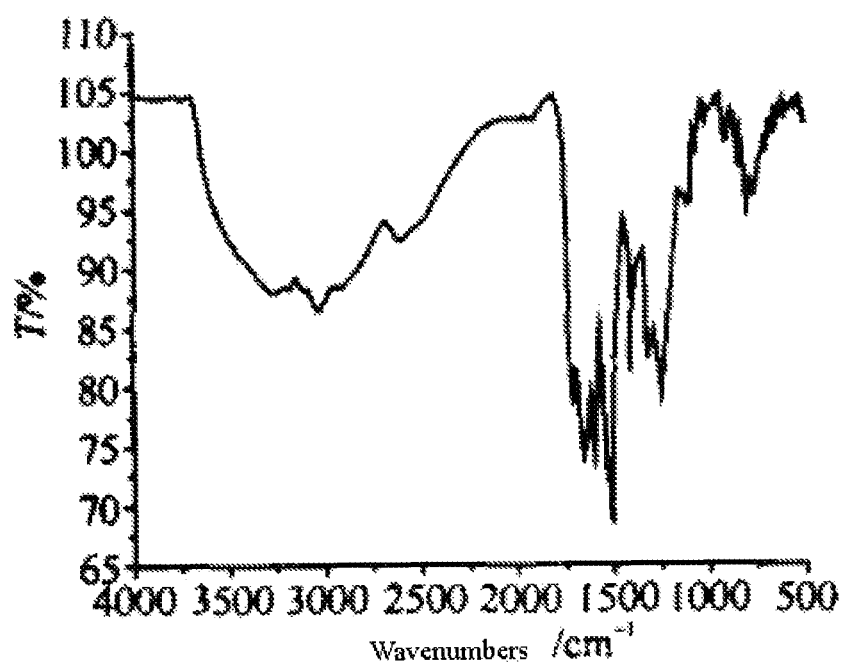
FIG. 4 is an infrared spectrum of the calcium salt of polyamic acid in Example 2.

The infrared spectrum of the calcium salt of polyamic acid obtained in the embodiments of the invention is shown in FIG. 4.

2. Mixing with Methyl Siloxane Oil

The polyamic acid salt particle thus obtained is thoroughly mixed with methyl siloxane oil by any of conventional methods, for example, agitation, etc., to make the solid particles, that is, the polyamic acid salt particle, have essentially the same density as the surrounding continuous phase to form a suspension system, resulting in the polyamic acid salt/silicone system of negative electrorheological fluid.

The electrorheological performance of the negative electrorheological fluid obtained is similar to that obtained by the previous method.

The specific examples of electrophoretic ink are given below.

Example 1

As Example 1, the electrophoretic ink is made from multiple electrophoretic ink microcapsules, which contain the polyamic acid salt/silicone oil system of negative electrorheological fluid as the electrophoretic display solution; and the polyamic acid salt accounts for 50% of the negative electrorheological fluid by mass-volume percentage.

Example 2

As Example 2, the electrophoretic ink is made from multiple Gyricons, which are surrounded by the poly(methyl methacrylate)/silicone oil system of negative electrorheological fluid as the electrophoretic display solution; and the poly(methyl methacrylate) accounts for 25% of the negative electrorheological fluid by mass-volume percentage.

Example 3

As Example 3, the electrophoretic ink is made from multiple electrophoretic ink microcups which contain the polytetrafluoroethylene/silicone oil system of negative electrorheological fluid as the electrophoretic display solution; and the polytetrafluoroethylene accounts for 10% of the negative electrorheological fluid by mass-volume percentage.

Example 4

As Example 4, the electrophoretic ink is made from multiple electrophoretic ink microcups which contain the magnesium hydroxide/silicone oil system of negative electrorheological fluid as the electrophoretic display solution; and the magnesium hydroxide accounts for 5% of the negative electrorheological fluid by mass-volume percentage.

Example 5

As Example 5, the electrophoretic ink is made from multiple electrophoretic ink microcapsules which contain the $TiO_2$ particle suspension containing 20% water of negative electrorheological fluid as the electrophoretic display solution.

Example 6

As Example 6, the electrophoretic ink is made from multiple Gyricons which are surrounded by the poly(p-phenylene vinylene)/silicone oil system of negative electrorheological fluid as the electrophoretic display solution.

Embodiment 2: Electronic Paper

Several specific examples of an electronic paper are given below

Example 1

The electronic paper of this example comprises the electrophoretic ink of an example of Embodiment 1, and further comprises a voltage-driven device with which the electronic paper itself controls the movement of the small display particles (spheres) in the electrophoretic display solution. This voltage-driven device is for example a passively driven device or an actively driven device. The actively driven device, for example, utilizes a thin film transistor (TFT) as the switch device, for example, by way of line-by-line scanning or interlaced scanning.

When the static image is to be maintained, no power supply is needed, thus it is very energy efficient. During dynamic image switching, only very little electric power is consumed for the switching, thus it saves plenty of electricity.

Example 2

The electronic paper of this example comprises the electrophoretic ink of an example of Embodiment 1 and a voltage-driven device with which the electronic paper itself controls the movement of the small display particles (spheres) in the electrophoretic display solution, and further comprises a signal processing device. The signal processing device is linked to a video signal, decides whether it is a static image or a dynamic image by sampling and analyzing on the video signal, and transmits a voltage signal to the electrophoretic display solution to control its viscosity. The voltage signal is at a low voltage during the static image maintenance and switches to a high voltage in the dynamic image switching. Consequently, in dynamic image switching the viscosity of the electrophoretic display solution is reduced, whereas in the static image maintenance the viscosity of the electrophoretic display solution can be increased.

Example 3

The electronic paper of this example comprises electrophoretic ink, a voltage-driven device with which the electronic paper itself controls the movement of the small display particles (spheres) in the electrophoretic display solution, and a signal processing device. The electrophoretic ink of this example comprises multiple electrophoretic ink microcups. The electrophoretic ink microcups contain a positive electrorheological fluid, a titanium dioxide micropowder/silicone oil system modified by rare earth, as the electrophoretic display solution. The signal processing device is linked to a video signal, decides whether it is a static image or a dynamic image by sampling and analyzing on the video signal, and transmits a voltage signal to the electrophoretic display solution to control its viscosity. The voltage signal is at a low voltage during the static image maintenance and is a high voltage in the dynamic image switching. Consequently, in dynamic image switching the viscosity of the electrophoretic display solution is reduced, whereas in the static image maintenance the viscosity of the electrophoretic display solution can be increased.

Embodiment 3: Display Method of Electronic Paper

An embodiment of the invention further provides a display method for the electronic paper, in which the viscosity of the electrophoretic display solution is changed by changing the electric field strength applied to the electrophoretic display solution so that the viscosity of the electrophoretic display solution becomes lower in dynamic image switching, and higher during static image maintenance.

Preferably, the video signal is subjected to sampling and analyzing with a signal processing device to determine whether it is a static image or a dynamic image, and the viscosity of the electrophoretic display solution is controlled according to the result of the determination.

In the method of the embodiment of the invention, it is preferred that the electric field strength inversely correlates with the viscosity of the electrophoretic display solution. That is, the viscosity of the electrophoretic display solution is very high without an electric field, and transiently becomes very low with existence of an electric field; and the viscosity of the electrophoretic display solution is as low as possible in the dynamic image switching and as high as possible during the static image maintenance. Therefore, faster dynamic image switching and better static image maintenance of the electrophoretic ink can be achieved.

In the method of the embodiment of the invention, when the electrophoretic display solution is a negative electrorheological fluid, the signal is a voltage signal. This voltage signal is at a low voltage during the static image maintenance and is at a high voltage in the dynamic image switching. Alternatively, when the electrophoretic display solution is a positive electrorheological fluid, the signal is a voltage signal. This voltage signal is at a high voltage during the static image maintenance and is at a low voltage in the dynamic image switching.

In the method of the embodiment of the invention, the negative electrorheological fluid can be anyone of the electrorheological fluid systems mentioned above. The positive electrorheological fluid can be a titanium dioxide micropowder/silicone oil system modified by rare earth; for its preparation, please refer to the method of preparation in literature, for example, Zhao et al. (Properties of Titania Electrorheological Fluids Modified by Rare Earth, Chinese Journal of Materials Research, 2000, 14(6): 604-608).

In a preferable embodiment, when the electrophoretic display solution in the electronic paper is a negative electrorheological fluid, only the driving voltage V1 with which the electronic paper itself controls the movement of the small display particles (spheres) exists. Because no extra voltage needs to be provided, no power supply is needed during the maintenance of the static image, thus it is very energy efficient. In dynamic image switching, little electric energy is consumed to switch the image, thus it saves plenty of energy. This also makes the structure of the electronic paper device very simple.

In an embodiment of the invention, when the electrophoretic display solution in the electronic paper is a negative electrorheological fluid, in addition to the driving voltage V1 with which the electronic paper itself controls the movement of the small display particles (spheres), a signal processing device may be further included, which additionally provides a voltage V2 to control the viscosity of the electrophoretic display solution. The additional voltage V2 applied depends on the range of voltage suitable for the elected electrorheological fluid. During static image maintenance, neither V1 nor V2 is applied. In dynamic image maintenance, both V1 and V2 are applied. In this way, the switching speed can be more rapidly increased. The additional voltage V2 and the electrorheological fluid can be both optional. The additional voltage V2 can be applied based on the elected electrorheological fluid, and the suitable electrorheological fluid can be elected depending on the magnitude of the additional voltage V2 in the electric circuit design. This increases the freedom in the design and process.

In an embodiment of the invention, when the electrophoretic display solution in the electronic paper is a positive electrorheological fluid, in addition to the driving voltage V1 with which the electronic paper itself controls the movement of the small display particles (spheres), a signal processing device may be further included, which additionally provides a voltage V2 to control the viscosity of the electrophoretic display solution. The additional voltage V2 applied depends on the range of voltage suitable for the elected electrorheological fluid. The video signal is subjected to sampling and analyzing with a signal processing device to determine whether it is a static image or a dynamic image. During static image maintenance, V1=0, and V2 exists. Both are required to together form a high voltage of over 100V. In dynamic image switching, V1 exists and V2 approaches 0. Both are required to together form a low voltage between 0 and 0.5 V.

<Beneficial Effects>

The beneficial effects of the embodiments of the invention are described as follows.

1. In embodiments of the invention, the viscosity of the electrophoretic display solution is changed by changing the electric field strength applied to the electrophoretic display solution to achieve the rapider dynamic image switching and better static image maintenance of the electrophoretic ink, achieve the effect of reducing the resistance in dynamic display and increasing the resistance during static image maintenance, and thereby solve the technical problems of slow dynamic image display and poor static image maintenance of the electrophoretic ink.

2. The electrorheological fluid used in the embodiments of the invention shows rapid changes in milliseconds in apparent viscosity and significant change in shear strength and elastic modulus under the action of external electric field. The performance of the material can be continuously modulated by the external electric field. With the increase of the strength of the external electric field, the strength of the material changes but is rapidly restored to the original state after the withdrawal of the external electric field. That is, its viscosity can be rapidly changed with the change of the electric field. This is exactly the key point for solving the technical problem which the invention faces.

This kind of electrorheological fluid will exhibit significant changes in the indicators such as viscosity, shear strength, creep compliance, complex modulus and the like under the action of an electric field, even liquid-solid phase transition due to transient polarization or transient physical crosslinking. This makes the liquid material have the characters of high stability and high responsiveness.

3. A preferred technical solution of the embodiments of the invention is to achieve the rapider dynamic image switching and better static image maintenance of the electrophoretic ink with a negative electrorheological fluid that correlates inversely with the externally applied electric field so that the resistance in the dynamic image switching is reduced and the resistance during the static image maintenance is increased.

The embodiments of the invention relate to a negative electrorheological fluid characterized in that after an electric field is applied through the electrodes the viscosity of the electrorheological fluid is reduced so as to achieve the object of reducing the resistance against the movement of the small display particles (spheres) to facilitate the change of the displayed image; and after the withdrawal of the electric field, its viscosity is increased so as to increase the resistance against the movement of the small display particles (spheres), thereby achieving the object to "lock" the image, and imparts great robustness of the displayed image.

In the preferable technical solutions of the embodiments of the invention, a better bistable state of the electrophoretic ink can be achieved with a negative electrorheological fluid. The bistable state is a major advantage of the electrophoretic ink which relieves the electronic paper from requiring power supply during the static image maintenance so as to achieve great energy efficiency, great static image maintenance, immunity of the image to shaking and pressing, and this great advantage can be strengthened in the invention. For example, when a document is browsed with an electrophoretic ink device, the display consumes no electric energy when displaying a certain page, and only when the next page is to be displayed, very little electric energy is consumed to switch the image. Again no electric energy is consumed when the image is static until the next page scrolling. Because the viscosity of a negative electrorheological fluid inversely correlates with the strength of the electric field, the viscosity is increased during the static image maintenance so as to achieve the objects of the rapider dynamic image switching and more "sticky" dynamic image maintenance of the electrophoretic ink, and in the meanwhile it saves more electric energy and is more energy efficient. More electricity saving and higher energy efficiency make the electrophoretic ink of the invention become a very promising green technique. Moreover, for an electronic device such as an outdoor or portable device, more electricity saving means a longer time period of usage of the same battery without power supply.

5. In the embodiments of the invention, the dynamic display speed and the ability of static image maintenance are increased and the problems of slow response of display of the electrophoretic ink and poor robustness in maintaining the image are mitigated by real-timely changing the viscosity of the electrophoretic display solution in the electrophoretic ink and properly increasing or decreasing the display resistance. The electronic paper display device comprising the electrophoretic ink of the invention also has the aforementioned advantages.

6. The reaction time of the electrophoretic ink microcapsules in the prior art is at the magnitude of hundreds of milliseconds. However, the image switching speed of the electrophoretic ink containing the negative electrorheological fluid of the embodiments of the invention are greatly reduced from the current magnitude of hundreds of milliseconds due to the reduction of the resistance against the movement of the particles. Its switching speed of the dynamic image is very fast, to the extent of dozens of milliseconds, even ten-plus milliseconds or even lower, usually between 5 and 50 milliseconds. In the meanwhile, the electrophoretic ink containing the negative electrorheological fluid of the invention has very good ability of static image maintenance. In case that the display screen is shaken by an external force or subjected to an externally applied strong field (not the electric field of the own electrodes of the display), the higher the viscosity of the negative electrorheological fluid, the higher its robustness and the more stable the static image.

Although the invention has been described in details above with general illustration and specific embodiments, some modifications or improvements would be obvious to a person skilled in the art on the basis of the aforementioned embodiments, for example, optimization or adjustment of the positive electrorheological fluid system or the negative electrorheological fluid system. Therefore, these modifications or improvements which are made without departure from the spirit of the invention should all fall within the scope of protection of the invention.

The invention claimed is:

1. Electrophoretic ink comprising an electrophoretic display solution which is a negative electrorheological fluid comprising a base solution, solid particles and an additive,
    wherein the additives are selected from the group consisting of water, acids, alkali, salts and surfactants,
    wherein the solid polyamic acid salt particles account for 5% to 50% of the negative electrorheological fluid by mass-volume percentage, and
    wherein the negative electrorheological fluid is polyamic acid salt/silicone oil system.

2. Electrophoretic ink according to claim 1, wherein the electrophoretic ink comprises multiple electrophoretic ink microcapsules, microcups or Gyricons, the electrophoretic ink microcapsules or microcups containing the electrophoretic display solution, or the Gyricons being surrounded by the electrophoretic display solution.

3. An electronic paper, comprising: electrophoretic ink comprising an electrophoretic display solution which is a negative electrorheological fluid comprising a base solution, solid particles and an additive, and
    a signal processing device, which is linked to a video signal, decides whether a static image or a dynamic image is transmitted by sampling and analyzing on the video signal, and transmits a voltage signal to the electrophoretic display solution to control its viscosity,
    wherein the additives are selected from the group consisting of water, acids, alkali, salts and surfactants,
    wherein the solid polyamic acid salt particles account for 5% to 50% of the negative electrorheological fluid by mass-volume percentage, and
    wherein the negative electrorheological fluid is polyamic acid salt/silicone oil system.

4. The electronic paper according to claim 3, wherein the electrophoretic ink comprises multiple electrophoretic ink microcapsules, microcups or Gyricons, the electrophoretic ink microcapsules or microcups containing the electrophoretic display solution, or the Gyricons being surrounded by the electrophoretic display solution.

5. A display method for the electronic paper according to claim 3, wherein the viscosity of the electrophoretic display solution is changed by changing the electric field strength applied to the electrophoretic display solution so that the viscosity of the electrophoretic display solution becomes lower in dynamic image switching and higher during static image maintenance.

6. The display method according to claim 5, wherein the electrophoretic display solution is a negative electrorheological fluid, and a low voltage is applied to the electrophoretic display solution during the static image maintenance and a high voltage is applied to the electrophoretic display solution in the dynamic image switching.

7. The display method according to claim 5, wherein a signal processing device is utilized to determine whether a static image or a dynamic image is transmitted by sampling and analyzing on the video signal, and control the viscosity of the electrophoretic display solution according to the result of the determination.

8. The display method according to claim 7, wherein the electrophoretic display solution is a negative electrorheological fluid, and a low voltage is applied to the electrophoretic display solution during the static image maintenance and a high voltage is applied to the electrophoretic display solution in the dynamic image switching.

* * * * *